United States Patent [19]
Nguyen

[11] Patent Number: 5,349,688
[45] Date of Patent: * Sep. 20, 1994

[54] METHOD FOR REDUCING POWER CONSUMPTION INCLUDES COMPARING VARIANCE IN NUMBER OF TIMES MICROPROCESSOR TRIED TO READ INPUT IN PREDEFINED PERIOD TO PREDEFINED VARIANCE

[75] Inventor: Au H. Nguyen, Santa Clara, Calif.

[73] Assignee: Chips & Technologies, Inc., San Jose, Calif.

[*] Notice: The portion of the term of this patent subsequent to Apr. 6, 2010 has been disclaimed.

[21] Appl. No.: 989,249

[22] Filed: Dec. 11, 1992

Related U.S. Application Data

[63] Continuation of Ser. No. 434,200, Nov. 13, 1989, Pat. No. 5,201,059.

[51] Int. Cl.$^5$ .................... G06F 15/00; G06F 11/30
[52] U.S. Cl. ................................. 395/800; 395/275; 395/750; 364/707; 364/DIG. 2; 364/264.4
[58] Field of Search .......... 395/750, 800, 275, 550; 364/707; 371/12, 16, 70

[56] References Cited

U.S. PATENT DOCUMENTS

| | | | |
|---|---|---|---|
| 4,203,153 | 5/1980 | Boyd | 364/200 |
| 4,365,290 | 12/1982 | Nelms et al. | 364/200 |
| 4,404,972 | 9/1983 | Gordon et al. | 128/419 PG |
| 4,554,920 | 11/1985 | Baker, Jr. et al. | 128/419 PG |
| 4,561,442 | 12/1985 | Vollmann et al. | 128/419 PG |
| 4,615,005 | 9/1986 | Maejima et al. | 364/200 |
| 4,649,373 | 3/1987 | Bland et al. | 364/707 |
| 4,698,748 | 10/1987 | Juzswik et al. | 364/200 |
| 4,823,292 | 4/1989 | Hillion | 364/707 |
| 4,851,987 | 7/1989 | Day | 364/200 |
| 4,856,524 | 8/1989 | Baker, Jr. | 128/419 PG |
| 4,907,150 | 3/1990 | Arroyo et al. | 371/14 |
| 4,924,496 | 5/1990 | Figa et al. | 379/142 |
| 4,941,201 | 7/1990 | Davis | 455/41 |
| 4,956,807 | 9/1990 | Hosaka et al. | 371/62 |
| 4,980,836 | 12/1990 | Carter et al. | 364/483 |
| 5,083,266 | 1/1992 | Watanabe | 395/275 |
| 5,142,684 | 8/1992 | Perry et al. | 395/750 |
| 5,167,024 | 11/1992 | Smith et al. | 395/375 |
| 5,201,059 | 4/1993 | Nguyen | 395/800 |
| 5,222,239 | 6/1993 | Rosch | 395/750 |

Primary Examiner—Alyssa H. Bowler
Assistant Examiner—Mehmet Geckil
Attorney, Agent, or Firm—Townsend and Townsend Khourie and Crew

[57] ABSTRACT

Two methods and apparatus for reducing power consumption in battery powered computers are disclosed. The first places the computer in a sleep mode whenever a certain data input function is called. The second applies statistical analysis to calls to another data input function. By measuring the number of times the computer has tried to read data from the keyboard over the past predefined period, the variance between the high and low number of calls over the present and preceding time periods, and whether the number of times the computer has tried to read data has both exceeded the present limit and remained within the preset variance limit for a predefined minimum time, the desirability of activating a sleep mode for the computer can be determined.

19 Claims, 4 Drawing Sheets 5,349,688

METHOD FOR REDUCING POWER CONSUMPTION INCLUDES COMPARING VARIANCE IN NUMBER OF TIMES MICROPROCESSOR TRIED TO READ INPUT IN PREDEFINED PERIOD TO PREDEFINED VARIANCE

This is a continuation of application Ser. No. 07/434,200 filed Nov. 13, 1989 now U.S. Pat. No. 5,201,059.

BACKGROUND OF THE INVENTION

This invention is in the field of digital computers. Specifically, it is a method and apparatus for placing the computer in an 'idle' or 'sleep' power saving mode while the computer waits for input.

In any computer, the speed of the computer's internal clock determines the rate of data processing. If all other factors are constant, a faster clock rate will result in faster processing. The penalty for faster processing is, unfortunately, increased power consumption. Every clock pulse causes at least some of the transistors in the central processing unit ('CPU') to change state. This change of state consumes power. Thus, the faster the clock rate, the more often transistors change state and the more power is consumed.

Although increased power consumption is not a major problem when a conventional A.C. power supply is available, it is a problem when batteries are used as the power source. To increase the useful operating time of computers powered by batteries, any means for reducing power consumption without impairing the operation of the computer is desirable.

One particular area where power savings may be realized is during the times when the computer is waiting for input from a keyboard or from an interface port. During these periods, the CPU continues to function in its standard mode, despite there being no work to do. Consequently, despite the fact that nothing is accomplished, power requirements are unchanged. A device or method which would reduce the power consumption of the CPU during these periods of waiting for data input is clearly desirable.

SUMMARY OF THE INVENTION

The present invention reduces CPU power consumption during periods when the CPU is waiting for keyboard or other data entry. Two different methods and apparatus for power consumption reduction are disclosed. These are Simple Sleep and Smart Sleep.

This invention operates in the specific environment of IBM PC AT compatible computers using Chips and Technology, Inc.'s LeAPset chipset.

In computers which fulfill the preceding requirements, two different procedures are used to allocate machine control while the computer waits for data input. In the first of these, control is turned over to the Basic Input/Output software ('BIOS') which in IBM PC ATs and compatibles is a software interface or "layer" which isolates operating systems from specific hardware devices. In the second, control remains with the application program, but calls are made to BIOS.

Simple Sleep operates when the first procedure is used. As its name implies, as soon as control is given to BIOS, the CPU is put into a sleep mode. This sleep mode can comprise either stopping the CPU, if the CPU is an 80286, or slowing the CPU's clock rate to 4 MHz, if the CPU is an 80386SX. With Simple Sleep, control remains with BIOS and the CPU sleeps until some input is received.

Smart Sleep is used when the second procedure is used. A statistical sampling analysis is made of the calls to BIOS. When the calls to BIOS are frequent enough, when their frequency remains relatively constant (limited variance) and when both the frequency and limited variance persist for a sufficient length of time, the computer is placed in a sleep mode.

BRIEF DESCRIPTION OF THE DRAWINGS

The present invention will now be explained in conjunction with the following figures in which.

BRIEF DESCRIPTION OF THE APPENDICES

Appendix A contains the computer software which operates the Simple Sleep aspect of the present invention. It is written in the 80286 assembly language.

Appendix B contains the computer software which operates the Smart Sleep aspect of the present invention. It is written in the 80286 assembly language.

Appendix C contains a description of the LeAPset chipset which implements the control logic in computers which can incorporate this invention.

DETAILED DESCRIPTION OF THE PREFERRED EMBODIMENT

The present invention operates in an environment which supports IBM's BIOS. A description of BIOS may be obtained in the "IBM Personal System/2 and Personal Computer BIOS Interface Technical Reference," 2nd Ed., May 1988, which is incorporated herein by reference.

Figure 1A:
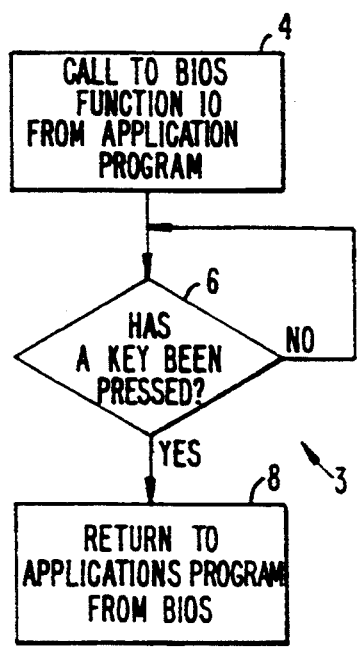
FIG. 1A is a flow chart of the procedure which invokes Simple Sleep.

Simple Sleep is activated by calls to BIOS functions INT 16H FUNC 0 or 10H, herein referenced as Function 3. A model flowchart for this function is shown in FIG. 1A. Application program 10 calls Function 3 at step 4, which turns control of the computer over to BIOS. Function 3 normally continues to ask step 6's question "Has a key been pressed?" until the answer is 'Yes'. When the key is pressed and the function can return a 'Yes', control returns to the application program at step 8.

The implementation of a sleep mode using Function 3 is relatively simple. As soon as BIOS receives control and no input from the keyboard is available, the computer is placed in the sleep mode. It awakens when a key is detected and control returns to the application program. The function which wakes the computer is implemented in the LeAP chipset. The software which effectuates Simple Sleep is listed in Appendix A. Referring to that appendix, whenever BIOS has control and no input is available, Simple Sleep is called. If the test at line 21 determines that Simple Sleep is enabled, the CPU is put to sleep. If Simple Sleep is not enabled, control immediately returns to the calling program.

Figure 1B:
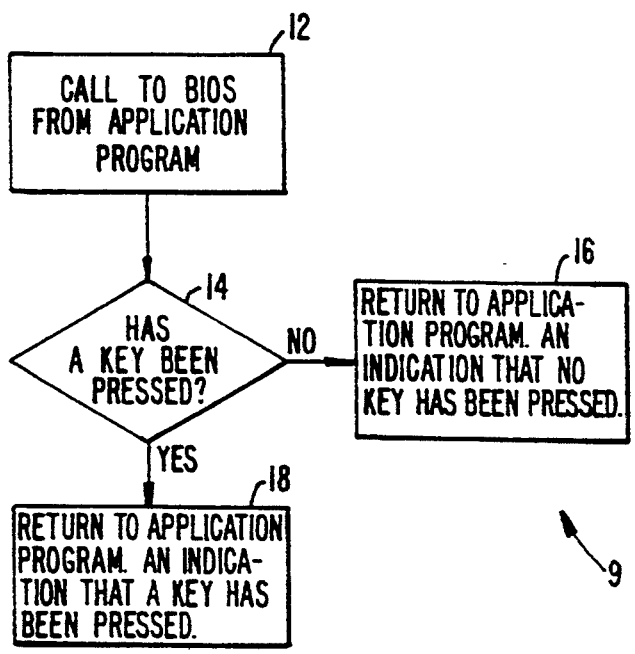
FIG. 1B is a flow chart of the procedure which invokes Smart Sleep.

Although Function 3 achieves the desired power reduction, it is not universally applicable. During many similar situations when the computer is waiting for input, useful work can be performed by the CPU prior to the receipt of the input. In these situations, simply putting the computer to sleep would not be the best course. As shown by FIG. 1B, when automatic sleep is undesirable, BIOS is called by Functions INT 16H FUNC 1 or 11H, herein referenced as Function 9. A call to Function 9 at step 12 does not turn control over to BIOS. Instead, Function 9 merely returns a Yes/No value (steps 4, 16, 18) every time it is called, depending upon whether a key is pressed or not. The application program will loop and continue calling Function 9 until a 'Yes' is received.

The Smart Sleep mechanism allows the computer to be placed in a sleep state in those situations where either no useful work can be accomplished between calls to BIOS or where whatever useful work could be performed has already been completed and the program is still waiting for input. Smart Sleep determines true idleness based on the frequency of calls to Function 9, the variance between the maximum number of calls to the function in a given time interval and the minimum, and the duration of a given frequency of calls over time.

It should be understood that different applications have different patterns of inactivity. The user sets the sensitivity of the Smart Sleep mechanism so that varying amounts of idleness can trigger the sleep mode, depending on the particular application. In essence, Smart Sleep uses a statistical process to determine when sleep can be commanded.

A running count of calls to Function 9 is kept for each clock tick interrupt interval. This count is compared to a preset number. If it is equal to or greater than the preset number, a tentative conclusion is drawn that sleep may be in order. The reason for a certain minimum number of calls being needed before sleep is commanded is that the calling program may be able to use the time between calls to Function 9 to do useful processing. If there was no minimum, occasional calls to the function might result in sleep, preventing the computer from performing useful work.

Next, the difference between the maximum number of calls to Function 9 and the minimum number of calls to the function during this and previous clock tick interrupt periods is calculated. This difference, herein called variance, is compared to a predefined maximum variance. If the variance is less than the maximum predefined variance, it means that the rate of calls to Function 9 have been fairly constant, another indication of possible idleness. Although some variance between the high and low number of calls is acceptable, too great a variance would indicate that some non-standard pattern has developed, a situation where the sleep mode would be inappropriate.

Finally, the conditions noted previously, the minimum number of calls exceeding the threshold and the variance between the high and low number of calls being in a certain range, must persist for a present amount of time. Requiring that the two previous described conditions persist for a certain amount of time insures that when the 'sleep' mode is commanded, it is appropriate.

Figure 3A:
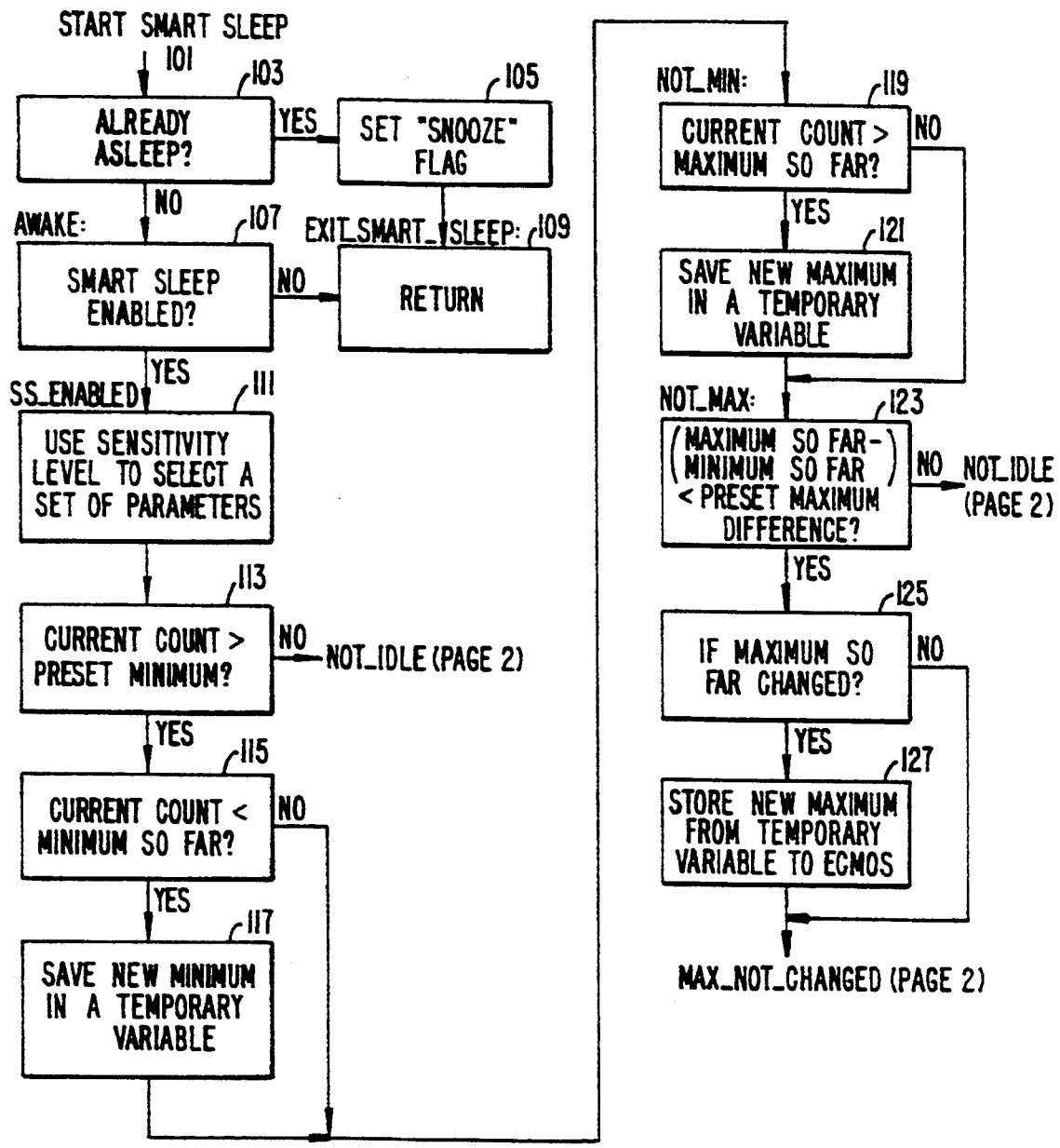
FIGS. 3A and 3B are a flow chart of the Smart Sleep mechanism.
Figure 3B:
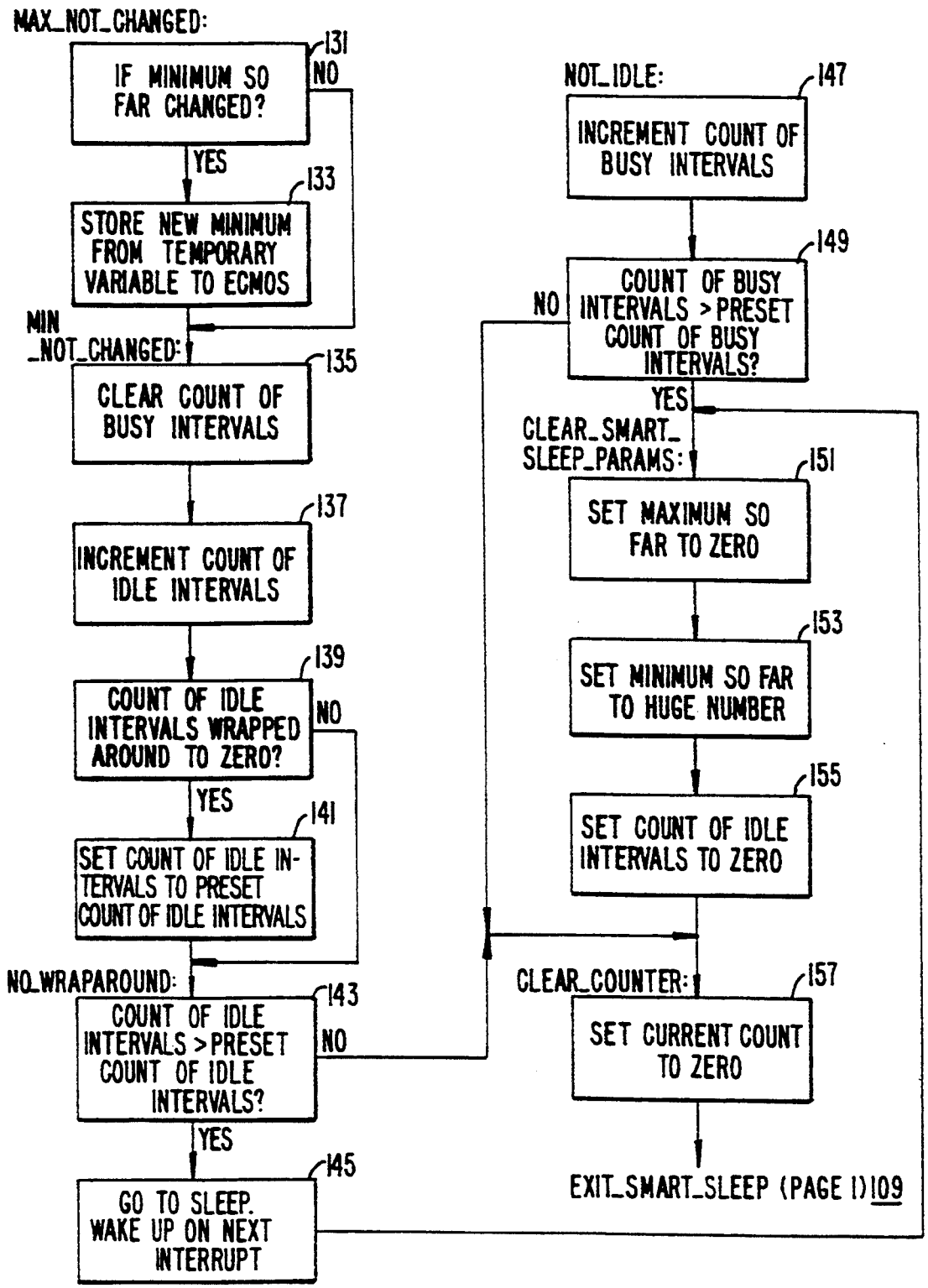

Smart Sleep will now be described with reference to both FIGS. 3A and 3B and Appendix B. The figures are referenced by the use of step numbers and the appendix is referenced by using line numbers.

Prior to actually calling Smart Sleep, various variables used therein must be properly initialized. This initialization occurs at lines 17-27 in Appendix B. The maximum count is set to zero, the minimum count is set to an impossibly large number, the variable which counts the number of calls to Function 9 is set to zero, the idle period counter is set to zero, and finally, the busy period counter is set to zero.

Figure 2:
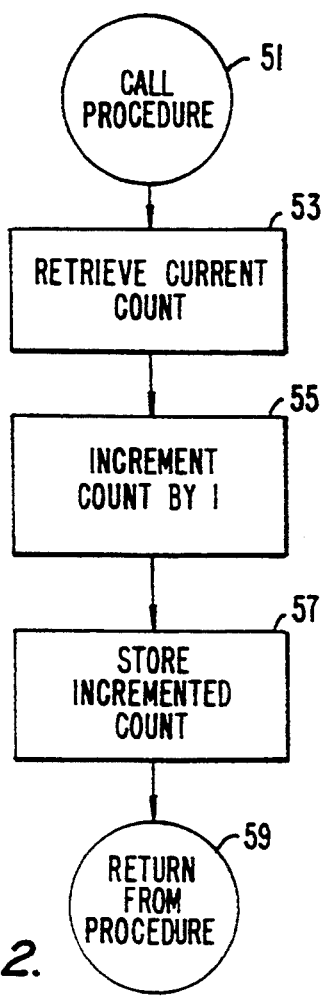
FIG. 2 is a flow chart of the counter function used by the Smart Sleep mechanism.

In the specific operating environment of the present invention, a clock tick interrupt is generated by the computer's hardware every 55 milliseconds. This is a standard feature of IBM PC ATs and compatibles. Every call to Function 9 during the interval between clock tick interrupts increments a counter variable. The procedure which increments the count is listed in Appendix B, lines 36-54 and shown in FIG. 2. The procedure comprises the steps of calling the procedure at step 51, retrieving the current count at step 53, incrementing the count by 1 at step 55, storing the incremented count at step 57 and returning to the calling program at step 59.

Every clock tick interrupt results in a call to Smart Sleep. Upon entry into the Smart Sleep mechanism at step 101 (lines 62-66), a test is made at step 103 to see if the CPU is already asleep (lines 73-76). If the CPU is sleeping, a "snooze" flag is set at step 105 (lines 77-79) and control returns to the calling program at step 109 (lines 214-219). If the CPU is not sleeping, the Smart Sleep Enable flag is tested at step 107. If the flag indicates that Smart Sleep is not enabled, control once again returns to the calling program at step 109.

If Smart Sleep is enabled, the sensitivity parameters to be used with it are recalled from memory at step 111 (lines 92-101). These parameters are recalled every time Smart Sleep is called. The first basic comparison test is performed at step 113. If the number of times Function 9 has been called does not exceed the preset minimum, it is assumed that the computer is not idle and control jumps to step 147 (lines 107-111). If the count does exceed the minimum, it is compared at step 115 to a variable which keeps track of the minimum number of times Function 9 has been called during any clock tick interrupt period (lines 117-120). If the current count is less than this minimum number it is stored in a temporary variable at step 117 (line 121). Whether or not the count is less than the minimum, it is also compared at step 119 (lines 122-128) to a similar variable which keeps track of the maximum number of times Function 9 has been called in any clock tick period. If the count exceeds the maximum to date, the count is stored at step 121 (line 129) as a temporary variable.

The next major test for the appropriateness of Smart Sleep occurs at step 123. The difference between the maximum count to this point in time and the minimum count is calculated. This difference, referenced herein as the variance, is compared to a preset maximum difference (lines 130-140). If the variance is greater than the preset maximum, control jumps to step 147. If it is less than this preset maximum, control moves to step 125.

Step 125 tests to see if the maximum count has changed (lines 144-146). If it has, the new maximum value is transferred from the temporary variable to permanent storage at step 127 (lines 147-149). If the maximum has not changed, a test is made at step 131 (lines 150-154) to see if the minimum count has changed. If it has, the new minimum count is moved from the temporary storage variable to permanent storage at step 133 (lines 155–157). If it has not, control skips to step 135.

At this point, there is a likelihood that the computer is at least idle at the present time. Therefore, the count of 'busy' time intervals is cleared at step 135 (lines 162–163) and the count of the number of idle intervals is incremented at step 137 (lines 170–172). The count of idle periods is checked to see if it has overflowed and been reset to zero at step 139. If it has overflowed, it is not desireable to begin counting idle periods from zero again as the sleep mode will not be triggered soon enough in that event. This contingency is accommodated by setting the count of idle periods to a preset number at step 141. (lines 174–177). If no overflow has occurred, control moves to step 143.

The final test to determine if sleep is appropriate occurs at step 143. The count of idle intervals is compared to a preset number of idle intervals (lines 178–179). If the idle intervals count does not exceed the preset interval count, program control goes to step 157, where the count of the number of times Function 9 has been called is reset to zero (lines 210–213) and control returns to the calling program at step 109. If the count did exceed the preset number, the CPU goes to sleep at step 145 (lines 186–188). At the next interrupt the CPU wakes up and control goes to step 151.

As indicated earlier, when either the first or second test for idleness fails, control goes to step 147. At step 147, the busy interval count is incremented (lines 195–200). If this count exceeds a preset number of busy intervals when this test is performed at step 149 (lines 201–202), program control flows to step 151. If not, control flows to step 157, the operation of which has already been described.

Step 151 is performed when either the count of busy intervals exceeds the preset maximum number of busy intervals or when the CPU wakes up upon receipt of an interrupt after being asleep. The maximum number of calls to Function 9 is reset to zero at step 151, the minimum is set to an impossibly large number at step 153, and the count of idle intervals is reset to zero at step 155 (lines 207–209). After step 155, control once again flows to step 157, which has been described previously. This completes the description of the Smart Sleep mechanism.

Figure 4:
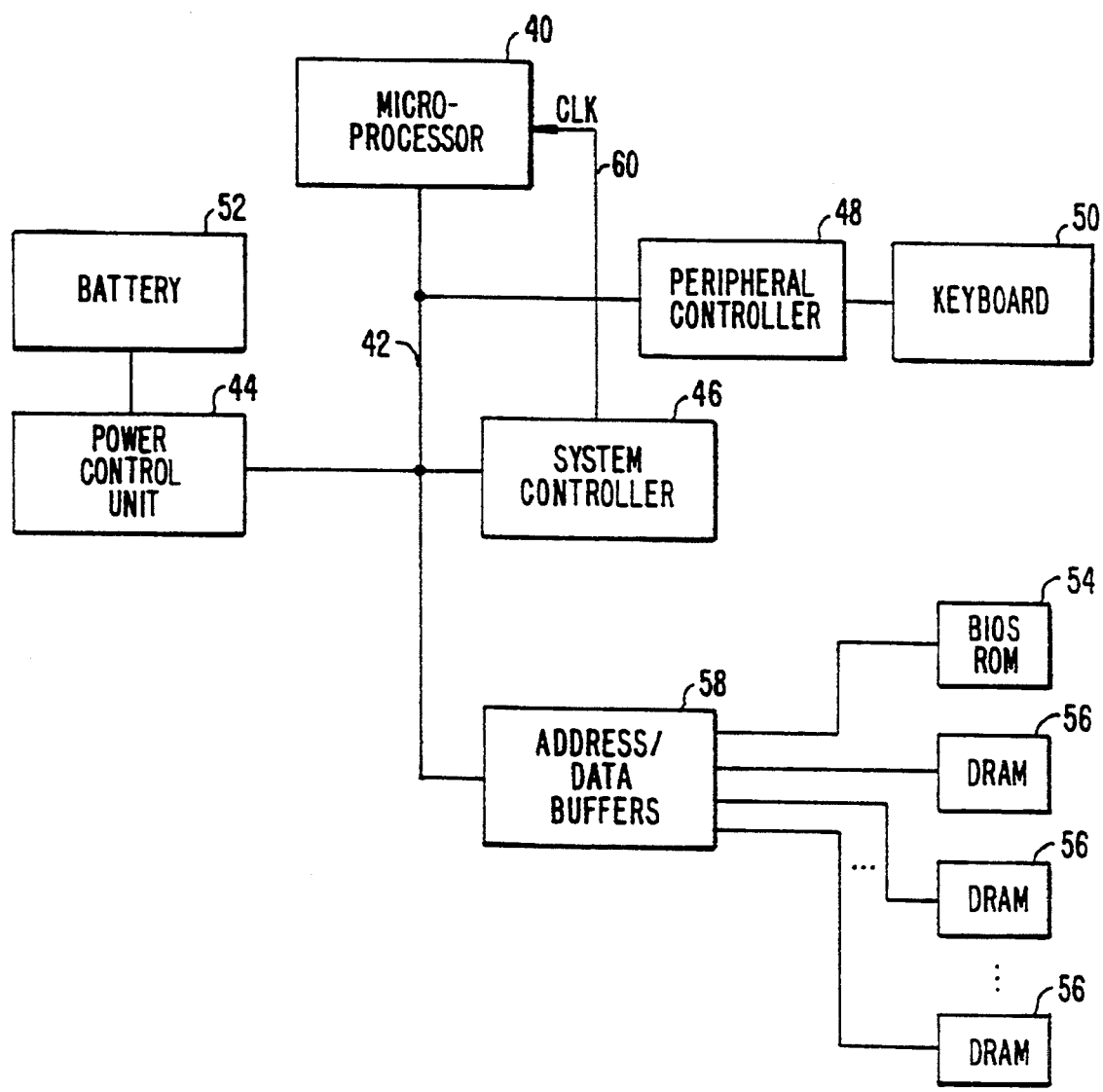
FIG. 4 is a block diagram of a computer system implementing the present invention.

FIG. 4 is a block diagram of a system implementing the present invention as described in more detail in Appendix C. A microprocessor 40 is connected, through a bus 42, to a power control unit 44, a system controller 46, and peripheral controller 48. Peripheral controller 48 receives inputs from keyboard 50. Power control unit 44 receives power from a battery 52. A BIOS ROM 54 and DRAM memory 56 are connected to an address/data buffer 58. System controller 46, in a preferred embodiment, is system controller 82C241 described in Appendix C which provides clock signal 60 to microprocessor 40. Power control unit 44 corresponds to unit 82C636 of Appendix C. Peripheral controller 48 corresponds to unit 82C206 of Appendix C.

Both Simple Sleep and Smart Sleep have been described in a particular embodiment in a particular environment. The LeAPset chipset, which forms the control logic, has a particular hardware configuration which enables it both to slow or stop the CPU's clock and to wake the CPU up. This hardware support is necessary for the proper functioning of this invention, but it is readily foreseeable that the hardware functions needed to support this invention will be implemented in other chipsets and other computers. Implementation of both these mechanisms in other computers would entail significant modification to the software contained in appendices A and B. However, such implementation on other battery powered computers or devices which use a CPU would provide equal benefits. Consequently, such modifications and alterations to enable the present device to operate in such environments is considered to be within the scope of this invention. The description and claims should therefore be read in a broad rather than a restrictive sense.

I claim:

1. A method for placing a microprocessor, having a clock generating a clock frequency, into a sleep state while the microprocessor waits for data input from a keyboard, the method being performed in a system controller coupled to said microprocessor and comprising the steps of:
   (a) counting a number of times the microprocessor has tried to read data from the keyboard in a predefined amount of time;
   (b) comparing said number of times the microprocessor tried to read data in the predefined amount of time with a predefined minimum number;
   (c) comparing the variance in said number of times the microprocessor tried to read data in a predefined amount of time to a predefined variance amount, if a number of tries exceeded said predefined minimum number;
   (d) comparing a length of time that both said number of times the microprocessor tried to read data exceeded said predefined minimum number and the result was less than the predefined variance to a predefined minimum time if the variance was less than the predefined variance; and
   (e) placing the computer into a sleep state if the length of time exceeded the minimum time, wherein in said sleep state, the clock stops generating the clock frequency.

2. The method of claim 1 wherein said microprocessor is a 80286.

3. The method of claim 1 further comprising the step of separately setting said predefined minimum number, said predefined variance, and said predefined minimum time.

4. The method of claim 1 wherein said predetermined time is $55 \times 10^{-3}$ seconds.

5. A method for placing a microprocessor, having a clock generating a clock signal with a first frequency, into a sleep state while the microprocessor waits for data input from a keyboard, the method being performed in a system controller coupled to said microprocessor and comprising the steps of:
   (a) counting a number of times the microprocessor has tried to read data from the keyboard in a predefined amount of time;
   (b) comparing said number of times the microprocessor tried to read data in the predefined amount of time with a predefined minimum number;
   (c) comparing the variance in said number of times the microprocessor tried to read data in a predefined amount of time to a predefined variance amount, if a number of tries exceeded said predefined minimum number;
   (d) comparing a length of time that both said number of times the microprocessor tried to read data exceeded said predefined minimum number and the result was less than the predefined variance to a predefined minimum time if the variance was less than the predefined variance; and (e) placing the computer into a sleep state if the length of time exceeded the minimum time, wherein in said sleep state, the clock signal has a second frequency.

6. The method of claim 5 wherein said second frequency is $4 \times 10^6$ hertz.

7. The method of claim 5 wherein said microprocessor is an 80386SX.

8. The method of claim 5 further comprising the step of separately setting said predefined minimum number, said predefined variance, and said predefined minimum time.

9. The method of claim 5 wherein said predetermined time is $55 \times 10^{-3}$ seconds.

10. A method for placing a microprocessor, having a clock generating a clock frequency, into a sleep state while the microprocessor waits for data input from a keyboard, the method being performed in a system controller coupled to said microprocessor and comprising the steps of:

(a) determining whether said microprocessor is presently in said sleep state;

(b) determining whether said sleep state can be invoked if said microprocessor is not presently in said sleep state;

(c) counting a number of time the microprocessor has tried to read data from the keyboard in a predefined amount of time if said sleep state can be invoked;

(d) comparing said number of times the microprocessor tried to read data in the predefined amount of time with a predefined minimum number;

(e) comparing said number of times the microprocessor tried to read data in the predefined amount of time with a predefined maximum number;

(f) comparing the variance in said number of times the microprocessor tried to read data in a predefined amount of time to a predefined variance amount, if a number of tries exceeded said predefined minimum number and was less than said predefined maximum number;

(g) comparing a content of an idle interval counter to a predefined idle interval number if said variance was less than the predefined variance; and (h) placing the computer into a sleep state wherein said clock frequency is stopped or reduced if said content exceeds said predefined idle number.

11. The method of claim 10 further comprising the step of:

(i) separately setting said predefined minimum number to a large number;

(j) separately setting said predefined maximum number to zero;

(k) separately setting said predefined variance to a first preset number;

(l) separately setting said predefined minimum time to a second preset number;

(m) separately setting said idle interval counter to zero; and (n) separately setting said predefined idle number to a preset number.

12. The method of claim 10 further comprising the step of replacing said number of times with said predefined minimum number if said number of times is less than said predefined minimum number.

13. The method of claim 10 further comprising the step of replacing said number of times with said predefined maximum number if said number of times exceeds said predefined maximum number.

14. The method of claim 10 further comprising the step of incrementing said idle interval counter by one if said predefined minimum number is less than said number of times and said maximum number is larger than said number of times.

15. The method of claim 10 further comprising the step of setting a snooze flag if said microprocessor is in said sleep state.

16. The method of claim 10 wherein steps (b)–(h) are skipped if said microprocessor is in sleep state.

17. The method of claim 10 wherein the control of said microprocessor is passed to a calling program if said sleep state can not be invoked.

18. The method of claim 17 wherein said calling program requests said sleep state.

19. The method of claim 10 wherein said predetermined time is $55 \times 10^{-3}$ seconds.

* * * * *